Feb. 13, 1940.     C. T. McCOY     2,190,104
METHOD OF AND MEANS FOR SEPARATING OIL AND GAS
Filed May 14, 1938     3 Sheets-Sheet 2
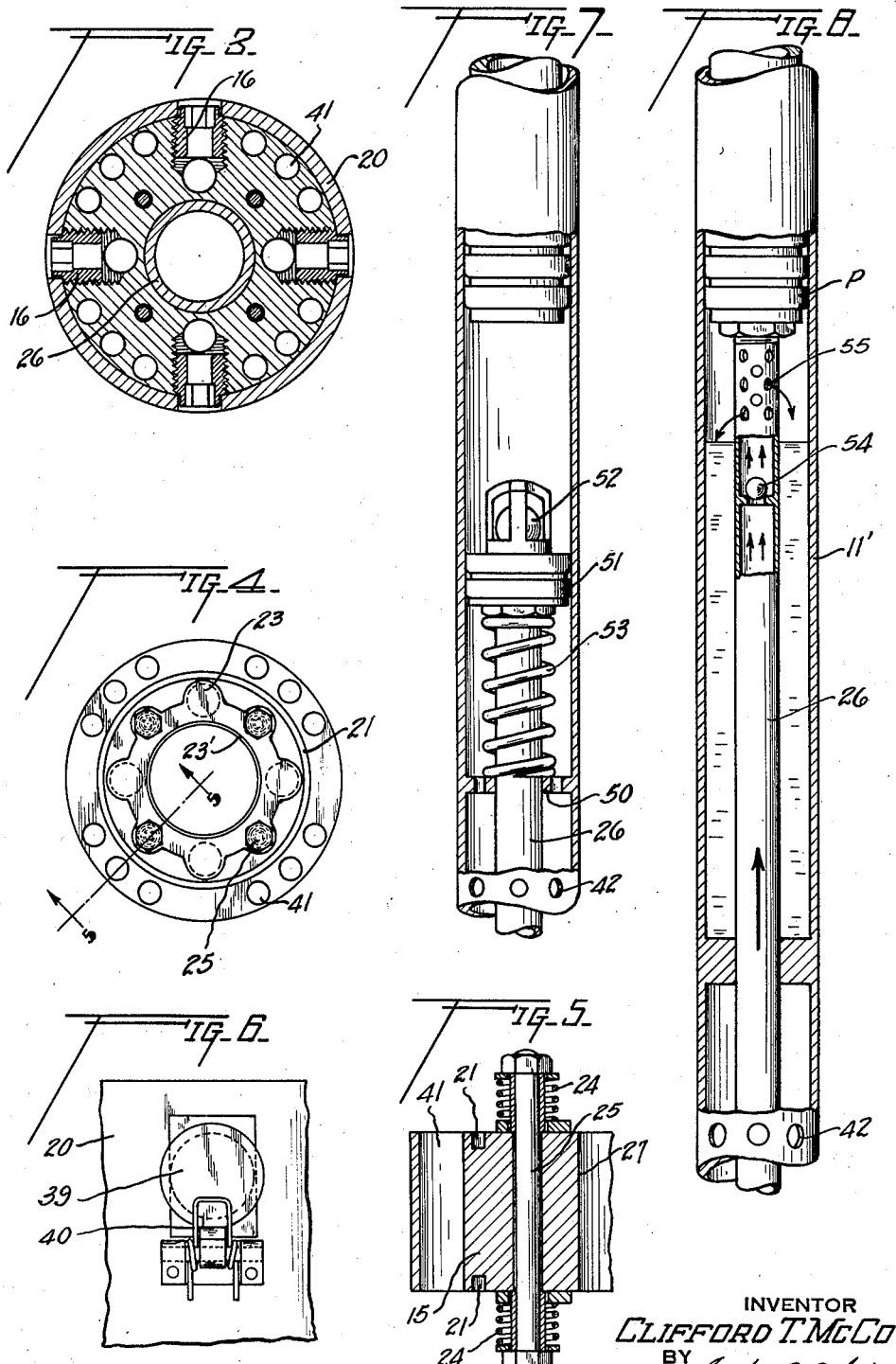
INVENTOR
CLIFFORD T. McCOY
BY
ATTORNEY

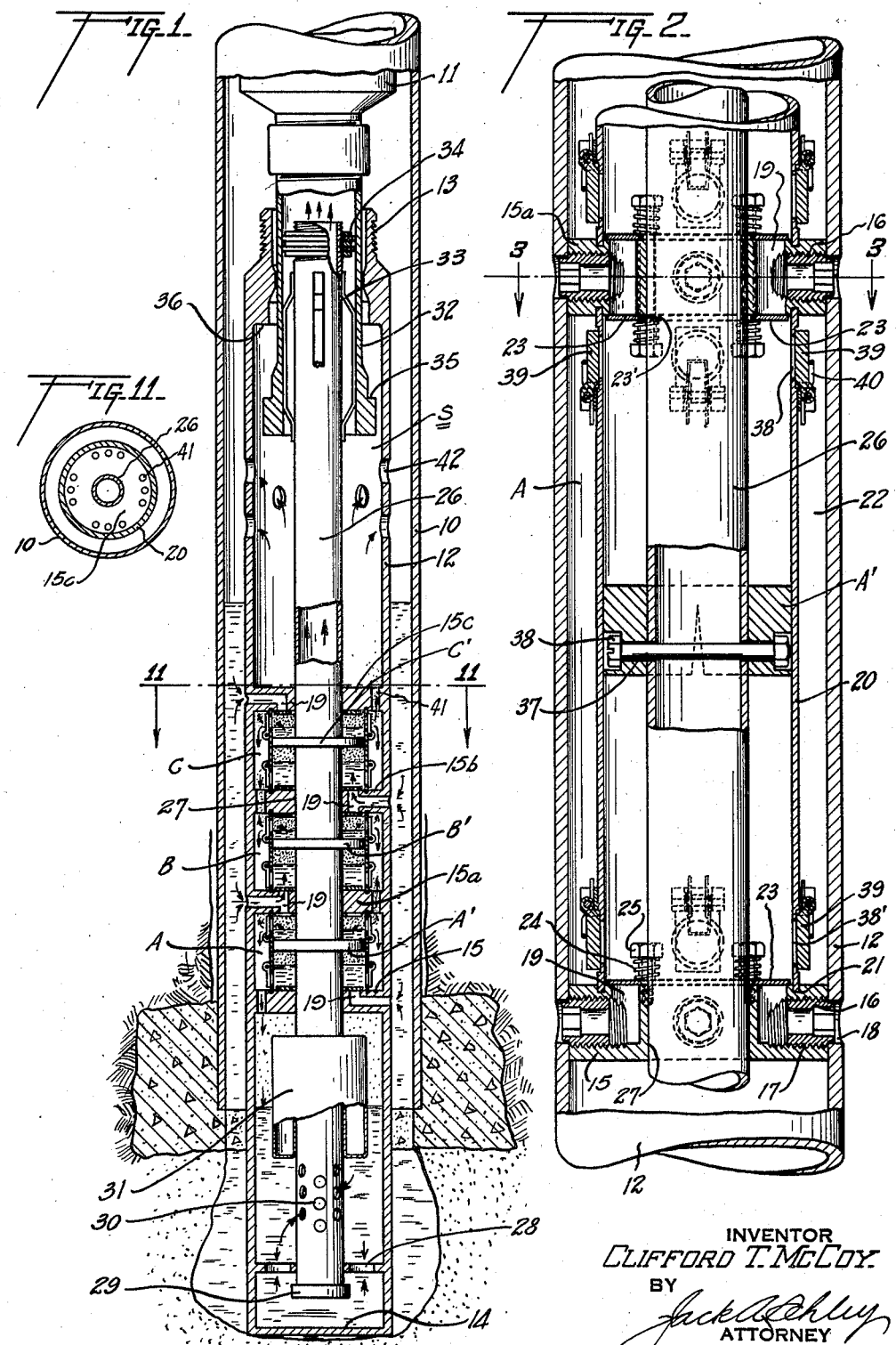

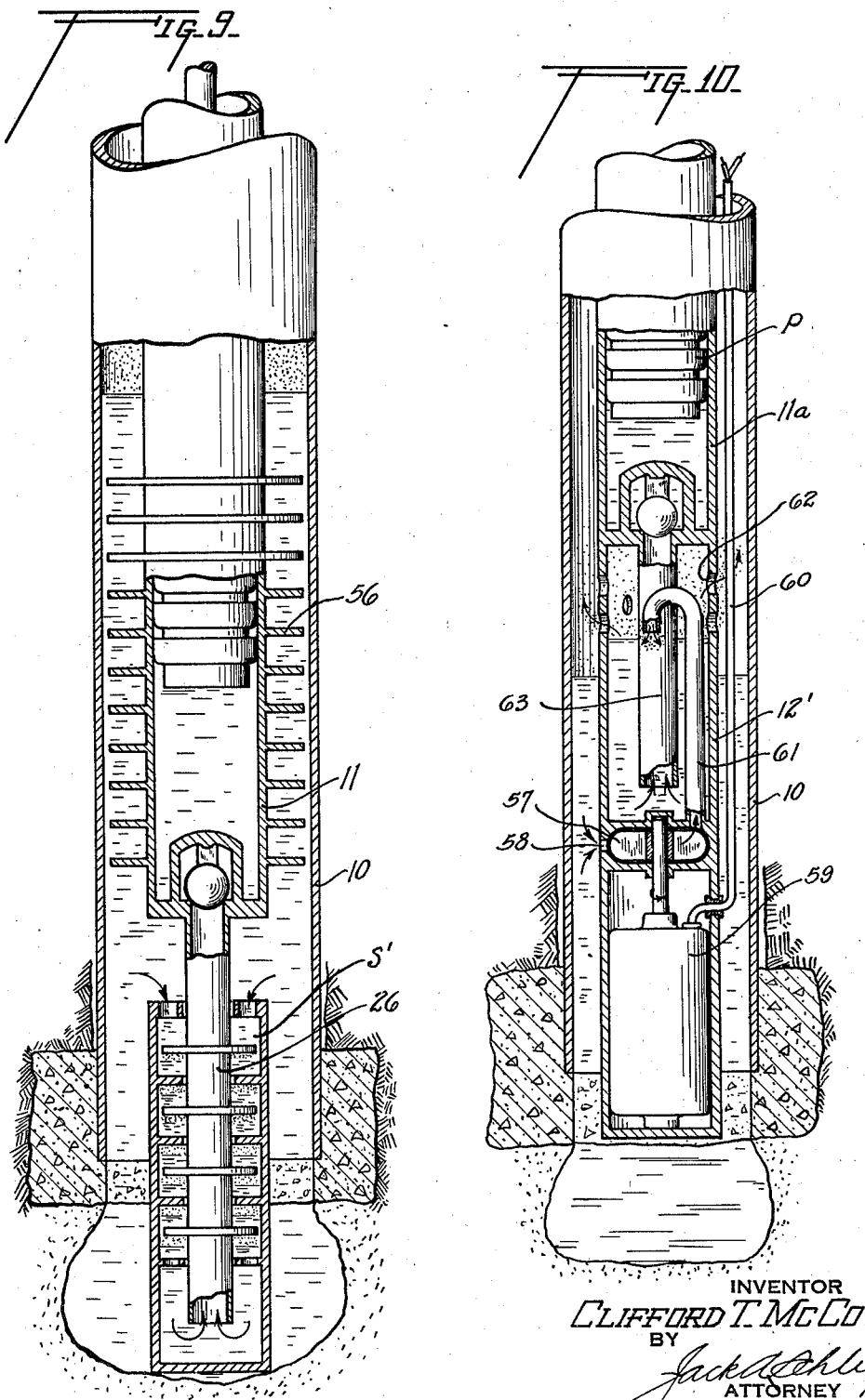

Patented Feb. 13, 1940

2,190,104

UNITED STATES PATENT OFFICE 2,190,104

METHOD OF AND MEANS FOR SEPARATING OIL AND GAS

Clifford T. McCoy, Shawnee, Okla.

Application May 14, 1938, Serial No. 207,923

25 Claims. (Cl. 103—203)

This invention relates to new and useful improvements in methods of and means for separating oil and gas.

One object of the invention is to provide an improved device for efficiently separating oil and gas at the bottom of the well bore, said device being commonly referred to as a gas anchor.

It is well known that in all producing oil wells, there is a certain amount of gas admixed with and produced with the oil. Some of this gas is free while the remainder is in solution with the oil. The presence of this gas admixed with the oil is undesirable because as pressures and temperatures in the well bore change, the gas is affected, with the result that undesirable conditions occur as the well fluids flow upwardly in the bore. Probably one of the greatest disadvantages of the presence of gas in the oil is the formation of paraffin on the wall of the well tubing. This paraffin formation is caused by the drop in pressure and temperature toward the surface of the hole, resulting in a liberation and expanding of the gas, both free and in solution. If the gas is separated from the oil at the bottom of the hole and prior to its delivery to the well pump, the disadvantages which are caused by the gas, are eliminated.

It is, therefore, an important object of the invention to provide an improved gas and oil separator which may be lowered to the bottom of the well bore on the tubing and which will efficiently separate the free gas, as well as some of the gas in solution from the oil, and prior to its delivery to the well pump.

Another object of the invention is to provide an improved method of separating oil and gas at the bottom of the well bore which consists in, agitating the well fluids by a mechanical means so as to bring about a separation of the free gas and some of the gas in solution from the oil, and then conducting the oil to the well pump or other lifting mechanism.

Still another object of the invention is to provide an improved oil and gas separator having means for agitating or maintaining the oil and gas mixture in constant motion at the bottom of the hole, whereby free gas is separated and gas in solution is liberated from the oil and also whereby sand and other foreign matter is held in suspension in the oil and is thus carried to the surface therewith, whereby accumulation of the sand and other foreign matter in the separator is prevented.

A further object of the invention is to provide an improved bottom hole oil and gas separator which is constructed so as to deliver the separated oil to the well pump under pressure, whereby any gas in solution which has not been separated is held in solution and is not liberated when delivered to the pump.

A particular object of the invention is to provide an improved separator, of the character described, which is capable of handling more fluid than the well pump whereby a constant circulation or movement through the separator occurs, which prevents choking of the separator in the event the pump misses a few strokes; the construction also obviating the pump heading gas, since the constant circulation eliminates the fluid coming to rest in the separator.

Another object of the invention is to provide an improved bottom hole separator which is operated by the reciprocatory motion of the well tubing, which motion is due to the elongation and retraction of the tubing string produced by the loading and unloading of the tubing by the pumping action of the well pump.

A further object of the invention is to provide an improved oil and gas separator, wherein the well fluid is drawn into a chamber and the pressure thereof reduced so that the gas in solution is liberated from the oil; there being independent outlets in the chamber for the separated gas and oil, whereby the oil alone may be delivered to the well pump.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view partly in elevation and partly in section of a separator, constructed in accordance with the invention and being illustrated schematically to show the fluid and gas circulation therethrough, Figure 2 is a transverse, vertical, sectional view taken through the lowermost compartment of the separator, Figure 3 is a horizontal, cross-sectional view taken on the line 3—3 of Figure 2, Figure 4 is a plan view of one of the intermediate compartment partitions, Figure 5 is a vertical, sectional view, taken on the line 5—5 of Figure 4, Figure 6 is an elevation of one of the flap valves on the exterior of the compartment wall, Figure 7 is a view partly in elevation and partly in section and showing another means of imparting movement to the separator piston, Figure 8 is a view similar to Figure 7, and illustrating a connection between the well pump and the separator piston, Figure 9 is a view partly in elevation and partly in section showing another form of the invention, Figure 10 is a view partly in elevation and partly in section showing still another modified form of the invention, and Figure 11 is a horizontal, cross-sectional view taken on the line 11—11 of Figure 1.

In the drawings, the numeral 10 designates the usual well casing which extends downwardly through the well bore and which has its lower end set at the bottom of said bore in the usual manner. The usual well tubing (not shown) extends axially through the well casing and has a working barrel 11 attached to its lower end. The usual well pump which includes the standing valve and the traveling valve, which parts are not shown, is reciprocable within the working barrel. The bottom of the well casing 10 is open whereby the well fluids may enter said casing and rise upwardly therein. When the well pump (not shown) is operated, the suction of said pump draws the well fluid upwardly into the working barrel and then lifts the same through the well tubing.

It is desirable, as has been pointed out, to separate the free gas, as well as the gas in solution with the oil, from said oil prior to the delivery of the oil to the working barrel and the well pump. In order to accomplish this separation, an oil and gas separator S is adapted to be attached to the lower end of the working barrel 11. The separator includes an elongate tubular housing 12 which is provided with a fishing neck or collar 13 at its upper end. The lower end of the housing is closed by a bottom 14. Within the housing and preferably nearer the lower end thereof, a plurality of partitions 15, 15a, 15b and 15c are provided and these partitions are equally spaced from each other so as to form a trio of chambers A, B and C within the housing. Each chamber is constructed in exactly the same manner and the lowermost chamber is shown in Figure 2. Since the construction of the chambers is identical, it is believed that a description of one will suffice.

The outer diameter of each partition is substantially equal to the inner diameter of the bore of the housing 12 and said partitions are held in place within the housing by hollow set screws 16 which are threaded into radial ports 17 formed in the partitions. The head of each set screw 16 engages within a radial opening 18 formed in the wall of the housing. Vertical ports 19 extend upwardly from the inner end of the radial ports 17 and in this manner fluid from the exterior of the housing 12 may flow through the set screws 16 and then upwardly through the ports 19.

An elongate sleeve 20, which has an outer diameter less than the inner diameter of the housing 12, is confined between the partitions and has its upper and lower edges engaging an annular groove 21 formed in the partitions. The size of the sleeve member 20 forms an annular space 22 between the outer surface of said sleeve and the bore of the housing 12. The vertical ports 19 in the partition 15 communicate with the interior of the sleeve 20, as is clearly shown in Figure 2. It is pointed out that in the lowermost partition 15, the vertical ports 19 extend only in an upper direction, while in the uppermost partition 15c, said ports extend only in a downward direction. The intermediate partitions 15a and 15b have their ports 19 extending entirely therethrough, whereby a flow through the ports of these partitions may enter the sleeve above or below said partitions. The ports 19 in each partition are normally closed by a valve plate 23 which overlies said openings. The plate is held in position over said opening by a coiled spring 24 which has its lower end engaging the plate. The spring is mounted on a suitable bolt 25 which is threaded into the partition. Manifestly, the lowermost partition 15, as well as the uppermost partition 15c, requires only a single valve plate 23, while the two intermediate partitions 15a and 15b require a double partition to close both the upper and lower ends of the ports 19 in these latter two partitions.

An elongate section of tubing 26 extends axially through the housing and through the chambers A, B and C. Suitable axial openings 27 are formed in the partitions to accommodate the tubing 26 and to permit a sliding movement of said tubing therethrough. Manifestly, each valve plate 23 has a central opening 23' through which the tubing 26 extends. The lower end of the tubing 26 is slidable through a guide web 28 and the lower end of said tubing below said web is closed by a suitable cap 29. Perforations 30 are formed in the tubing 26 so as to establish communication between the interior of the housing below the partition 15 and the interior of said tubing. An annular float 31 surrounds the lower end of the tubing and is slidable vertically thereon. The float is arranged to close the ports or openings 30 in the tubing 26, as will be explained.

The upper end of the tubing extends into a tubular sleeve 32 which is connected to the lower end of the working barrel 11. A plurality of friction springs 33 are formed on the exterior of the tubing 26 and are adapted to frictionally engage the bore of the sleeve 32. A suitable packing ring or rings 34 are fastened to the upper end of the tubing section 26 and pack off the annular space between the sleeve 32 and said section. The lower end of the sleeve 32 is formed with an external flange 35 which is adapted to abut an internal annular flange 36 formed within the bore of the housing 12 at the upper end thereof, whereby upward movement of the sleeve with relation to the housing is limited.

With the above arrangement, the housing 12 and its associate parts are secured to the lower end of the working barrel 11 and are adapted to be lowered into the well bore. During the operation of the device, the lower end of the housing 12 rests on the bottom of the bore, as is clearly shown in Figure 1. The well fluids from the producing sand will rise upwardly in the well casing in the usual manner and the level to which they rise will, of course, depend upon the particular well. The well fluid will flow through the ports 18 in the housing 12 and will thereby enter the vertical ports 19 in the partitions. However, the well fluid cannot enter the sleeves 20 until the valve plates 23 are lifted.

In order to draw the well liquid which is standing in the well casing into the interior of the various sleeves 20 of the chambers A, B and C, the tubing section 26 is provided with a plurality of pistons A', B' and C'. The piston A' is adapted to reciprocate within the sleeve 20 of the chamber A, while the piston B' reciprocates within the sleeve 20 of the chamber B and the piston C' reciprocates within the sleeve 20 of the chamber C. The piston may be constructed of any suitable material, but it is preferably an annular element which surrounds the tubular section 26. A transverse bolt 37 passes through the piston and also through the section 26 and receives a nut 38 on its opposite end, whereby the piston is fixed on said section.

The tubing section 26 is arranged to be reciprocated vertically, its stroke being limited by the movement of the cap 29 on its lower end between the guide web 28 and the bottom 14 of the housing. The particular means by which said section is reciprocated is subject to variation, as will be hereinafter explained and for the purposes of describing the operation of the separator, the particular method of reciprocation will be omitted. As the tubing section moves upwardly, the piston A' within the sleeve 20 of the lowermost chamber A (Figure 2) moves upwardly to create a suction sufficient to raise the valve plate 23, whereby the well fluid is drawn into the interior of the sleeve 20 below the piston. As the piston A' moves upwardly, the fluid above said piston which had been drawn into the sleeve 20 upon the previous operation, is forced upwardly against the valve plate 23 on the bottom of the partition 15a, whereby said valve plate is closed. This fluid is expelled from the interior of the sleeve through ports 38 which are formed in the upper end of said sleeve. The ports are normally closed by flap valves 39 which are hinged to the exterior wall of the sleeve. Suitable springs 40 normally urge the flap valves 39 to a closed position. Therefore, upon the upstroke of the piston A', well fluid is drawn from the casing 10 through the ports 19 and into the lower end of the sleeve 20 of the chamber A. At the same time, the fluid above the piston is expelled through the ports 38 and into the annular space 22 between the sleeve 20 and the housing 12. A similar action takes place within the sleeve 20 of the chambers B and C, the well fluid being drawn into said sleeve through the ports 19 in the partitions forming the bottom of said chambers, and being expelled through the ports 38 in the upper end of the sleeve.

The fluid which is expelled into the annular space 22 may flow from one chamber to the other through a plurality of ports 41, which are formed in the partitions between the radial ports 17. It is noted that the vertical ports 41 are located in alinement with the annular space 22 whereby communication between the annular spaces of the various chambers is had. Upon entering the annular space, the free gas and the gas which has been liberated from the oil will rise upwardly through said annular space and finally enter the interior of the housing 12 above the uppermost partition 15c. From the interior of the housing, this gas may escape through ports or openings 42 provided in the housing wall and, thus, the freed or separated gas is passed into the casing 10 above the liquid level therein. The liquid which is expelled from the sleeves 20 into the annular space 22 flows downwardly through said annular space and finally enters the housing 12 below the lowermost partition 15. This liquid may enter the openings 30 in the lower end of the tubing section and when the well pump (not shown) in the working barrel 11 is operated, said liquid is pulled upwardly through the tubing section in the usual manner and then is lifted into the tubing string (not shown) to which the working barrel is attached. It is noted that the separated liquid which flows downwardly into the bottom of the housing 12 acts upon the float 31 which is slidable on the tubular section 26. In the event that insufficient fluid or liquid is entering the lower end of the housing, the float 31 will automatically fall so as to cover the ports 30 and will remain in this position until such time as sufficient fluid or liquid has entered the bottom of the housing.

Upon the downstroke of the tubing section 26, fluid is drawn into the interior of the sleeve of the lowermost chamber through the ports 19 in the partition 15a and, at the same time, the fluid which had been drawn into said sleeve below the piston A' upon the previous operation, is expelled through ports 38' formed in the lower end of the sleeve 20. These ports are similar to the ports 38 and are normally closed by flap valves 39'. In this manner, fluid is drawn into the sleeves 20 upon both the upstroke and downstroke of the section 26 and, at the same time, the fluid which had been previously drawn into said sleeves is expelled therefrom.

As the fluid is drawn into the sleeve, it is agitated by its passage through the angular port and also by its contact with the valve plate 23. This agitation tends to free some of the gas in solution and definitely separates the free gas from the oil. Also since the valve plate 23 must open under tension of the spring 24, considerable suction must be developed by the piston A' to draw or pull the well fluid into the sleeve; this suction lowers the pressure within the sleeve and thereby permits the gas to expand out of solution with the oil, whereby when it is discharged from the sleeve, the gas will readily separate and flow upwardly through the annular space 22 and the liquid will flow downwardly therethrough, as has been explained. The pumping action of the pistons also tends to further agitate the well fluids to increase the separation of gas and oil. Thus, it will be seen that the oil and gas are separated and the gas is directed into the casing 10 above the well fluid, while the separated liquid is conducted downwardly to the openings 30 in the tubing section 26, whereby the well pump (not shown) may lift the liquid upwardly through the well tubing. In this manner, all of the free gas and a portion of the gas in solution is separated from the liquid, with the result that liquid alone is lifted through the tubing. It is pointed out that the gas outlet ports 41 in the uppermost partition 15c are of less diameter than the ports 41 in the other partitions and, therefore, a back pressure is built up in the annular space 22. This back pressure acts upon the liquid passing downwardly through the annular space 22 and through the ports 30 to maintain said liquid under a pressure. The action of the pistons A', B' and C' aids in maintaining this pressure and therefore the liquid delivered to the well pump is under pressure. By holding this liquid under pressure, the tendency of any gas in solution with the liquid to separate therefrom, is eliminated and therefore the possibility of the gas separating from the liquid after it reaches the well pump is obviated. The capacity of the separator is preferably greater than the well pump capacity so that a recirculation of liquid may occur, for if the liquid in the annular chamber 22 builds up sufficiently to enter the upper end of the housing 12, it will pass into the casing 10 and be recirculated. Thus, the liquid is agitated and is constantly in movement and the sand or other foreign matter is held in suspension therein and cannot settle out to accumulate in the bottom of the separator.

As has been explained, any suitable means may be employed for reciprocating the tubing section 26 in order to operate the pistons A', B' and C'. In Figure 1, the connection between the tubing section and the depending sleeve 32 makes it possible to utilize the elongation and retraction of the well tubing (not shown), which elongation and retraction occurs through the operation of the well pump in the working barrel, to operate or reciprocate the section 26. It is well known that as the well pump operates and the pump plunger moves downwardly, the entire liquid load in the tubing is on the tubing string, with the result that the tubing string elongates. It has been found that in some instances a string of tubing within a well from five to six thousand feet may elongate as much as ten or twelve inches. Upon the upstroke of the plunger, the liquid load in the tubing is upon the plunger and the pump rod and is not upon the tubing string, with the result that the stretched or elongated tubing returns to its normal position. Thus, upon each stroke of the well pump, the tubing is elongated and retracted.

By connecting the sleeve 32 which is attached to the working barrel 11 carried by the tubing string (not shown), with the upper end of the tubing section 26, it will be manifest that as said sleeve moves upwardly and downwardly due to the elongation and retraction of the tubing, a similar reciprocatory movement will be imparted to the section 26. In this manner, it is possible to operate the pistons A', B' and C' by utilizing the motion of the tubing and auxiliary means for reciprocating the section 26 is not necessary.

In Figure 7, a modified form of operating means for reciprocating the section 26 is disclosed. In this form, the working barrel has a diameter equal to the diameter of the sleeve 32 in Figure 1 and said working barrel extends downwardly into the upper end of the housing 12, which housing is not shown. If desired, the working barrel could form a continuation of the housing. In this form, the upper end of the section 26 extends through a guide web 50 and has a suitable piston 51 secured to its extreme upper end. The usual standing valve 52 is secured to the piston and closes the bore thereof. A coiled spring 53 is confined between the piston 51 and the web 50 and exerts its pressure to constantly urge the section 26 to its uppermost position.

In the operation of this form of the invention, upon the downstroke of the pump plunger, the standing valve 52 is seated and the liquid load above said valve forces the tubing section 26 downwardly under tension of the spring 53. When the pump plunger begins its upward stroke to lift the liquid column, the load above the standing valve 52 is relieved, with the result that the spring 53 immediately returns said standing valve to its uppermost position. In this manner, the load of the liquid within the tubing is utilized to force the section 26 downwardly, while the spring 53 is depended upon to raise the same.

It would be possible to secure the section 26 directly to the pump plunger P and this construction is clearly shown in Figure 8. In this case, the upper end of the section 26 is threaded into the lower end of the plunger and a suitable check valve 54 is provided within the section near the upper end thereof. A plurality of perforations 55 are formed in the section 26 above the check valve. In the operation of this form, the upstroke of the plunger P moves the section upwardly and also draws fluid from within the interior of the section through the perforations 55 and into the working barrel 11'. At the same time, the liquid within the lower end of the working barrel is lifted. Upon the downstroke of the plunger, the check valve 54 seats to prevent a back flow through the section 26. Thus, the reciprocatory motion of the plunger P is utilized to reciprocate the section 26 and operate the pistons A', B' and C'.

In Figure 9, a modified form of the invention as disclosed in Figure 1 is schematically shown. In this form, the separator S' is connected to the lower end of the working barrel 11 by the same means as that disclosed in Figure 1 and the section 26 is operated in a similar manner. However, the valves and pumping action of the first form is omitted and the uppermost chamber is open so that the fluid within the well casing 10 may enter said uppermost chamber. This device is particularly adapted for use in wells having a high standing liquid level. In such instances, the head of the oil column above the pump barrel 11 will supply the necessary pressure to prevent the pump plunger from drawing a vacuum as it takes the oil. A plurality of radial fins 56 are provided on the outer surface of the pump barrel and as the fluid passes said fins, it is agitated which serves to knock out the gas in solution before it is subjected to the action of the separator. In the operation of the separator, the agitation or constant motion of the well fluids causes a separation of the gas and oil and also prevents the sand and other foreign matter from settling out of the fluid.

In Figure 10, still another form of the invention is shown. In this form, a working barrel 11a is extended downwardly to form a separator housing 12'. A centrifugal pump 57 is mounted in the lower end of the housing and draws the well liquid from the casing 10 through a port 58. The pump is driven by a suitable motor 59 supplied with current by a cable 60. The well fluids are pumped upwardly through a tube 61 which extends upwardly within the housing 12'. The upper end of the tube is curved downwardly so that the well fluids are ejected into the interior of the housing. The upper end of the housing has gas escape ports 62 while an axial tube 63, having a diameter larger than the diameter of the tube 61, leads from the standing valve of the pump. The operation of this form is obvious. The well fluids which are conducted into the housing 12' are agitated by the pump and are then expanded which lowers their pressure, whereby the free gas, as well as some gas in solution, will immediately rise to the upper end of the chamber 12'. The liquid or oil which is heavier falls to the bottom of the chamber and is drawn upwardly through the axial tube 63 by the action of the pump plunger P. The gas which is separated from the oil escapes through the outlet ports 62 into the casing 10 above the liquid level therein.

In all forms, it is noted that the well fluids are agitated and kept in constant motion, whereby the free gas, as well as some gas in solution, is separated from the oil. The liquid which is separated is then conducted or delivered to the well pump under a pressure, whereby any liberation of gas after it reaches said pump is prevented. It is noted that in the pump form shown in Figure 1, the capacity of the separating device is greater than the capacity of the pump and also that a constant circulation through the separator is had. This constant circulation does not allow the ports or valve chambers to become choked from sand which will settle out of the well fluids in the event that the pump should miss a few strokes while heading gas. In fact, heading of the pump is prevented because the fluid in the separator is never at rest or dormant because of the constant circulation. Further, in those forms wherein a pumping action is had in addition to the agitation, the pressure of the well fluids entering the separating chamber is reduced to further promote separation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An oil and gas separator adapted to be lowered to the lower end of a well bore including, a housing having a separating chamber for receiving the well fluid consisting of a gas-oil mixture, movable means for agitating the mixture to separate the gas from the oil, and means for conducting the separated oil to the well tubing string whereby said oil may be lifted within said string.

2. An oil and gas separator adapted to be lowered to the lower end of a well bore including, a housing having a separating chamber for receiving the well fluid consisting of a gas-oil mixture, means for agitating the mixture to separate the gas from the oil, means for conducting the separated oil to the well tubing string under a pressure to hold the gas in solution in said separated oil, and means for delivering said gas to the exterior of the tubing string.

3. An oil and gas separator adapted to be connected to the lower end of a tubing string and lowered therewith into the well casing, said separator including, a housing having a separating chamber therein, means for circulating the well fluid consisting of a gas-oil mixture through the chamber to separate the gas from the oil, and means for conducting the separated oil to the well tubing under a pressure, whereby any gas in solution in said oil is held therein.

4. An oil and gas separator adapted to be connected to the lower end of a tubing string and lowered therewith into the well casing, said separator including, a housing having a plurality of separating chambers therein, means for circulating the well fluid consisting of a gas-oil mixture through the chambers to separate the gas from the oil, means for conducting the separated oil to the well tubing under a pressure, whereby any gas in solution in said oil is held therein, and means for conducting the separated gas from the chambers and into the casing above the fluid level therein.

5. An oil and gas separator adapted to be connected to the lower end of a tubing string and lowered therewith into the well casing, said separator including, a housing having a plurality of separating chambers therein, and a reciprocating piston in each chamber for drawing the well fluid from the casing into said chamber wherein the free gas and some gas in solution is liberated, said pistons also acting to expel the separated gas and oil from the chamber.

6. An oil and gas separator adapted to be connected to the lower end of a tubing string and lowered therewith into the well casing, said separator including, a housing having a plurality of separating chambers therein, a reciprocating piston in each chamber for drawing the well fluid from the casing into said chamber wherein the free gas and some gas in solution is liberated, said pistons also acting to expel the separated gas and oil from the chamber, and means for conducting the separated oil to the well tubing whereby the well pump operating in said tubing may lift the same.

7. An oil and gas separator adapted to be connected to the lower end of a tubing string and lowered therewith into the well casing, said separator including, a housing having a plurality of separating chambers therein, a reciprocating piston in each chamber for drawing the well fluid from the casing into said chamber wherein the free gas and some gas in solution is liberated, said pistons also acting to expel the separated gas and oil from the chamber, means for connecting the pistons to the well tubing whereby said tubing is utilized to reciprocate the same, and means for conducting the separated oil to the well tubing whereby the well pump operating in said tubing may lift the same.

8. An oil and gas separator adapted to be connected to the lower end of a tubing string and lowered therewith into the well casing, said separator including, a housing having a plurality of separating chambers therein, a reciprocating piston in each chamber for drawing the well fluid from the casing into said chamber wherein the free gas and some gas in solution is liberated, said pistons also acting to expel the separated gas and oil from the chamber, means for conducting the separated oil to the well tubing whereby the well pump operating in said tubing may lift the same, and means for releasing the separated gas into the casing above the well fluid level therein.

9. An oil and gas separator adapted to be connected to the lower end of a tubing string and lowered therewith into the well casing, said separator including, a housing having a plurality of separating chambers therein, a reciprocating piston in each chamber for drawing the well fluid from the casing into said chamber wherein the free gas and some gas in solution is liberated, said pistons also acting to expel the separated gas and oil from the chamber, means for connecting the pistons to the well tubing whereby said tubing is utilized to reciprocate the same, means for conducting the separated oil to the well tubing whereby the well pump operating in said tubing may lift the same, and means for releasing the separated gas into the casing above the well fluid level therein.

10. The combination with a well casing and a well tubing having a reciprocating fluid pump therein of an oil and gas separator connected to the lower end of the tubing and including, a housing having a plurality of separating chambers therein, means for drawing the well fluids from the casing into the chambers, movable means for agitating said fluids as well as reducing the pressures thereon as said fluids enter the chambers whereby the free gas and some of the gas in solution is released from the oil, and means for conducting the separated oil from the chambers to the tubing string whereby said oil is delivered to the well pump.

11. The combination with a well casing and a well tubing having a reciprocating fluid pump therein of an oil and gas separator connected to the lower end of the tubing and including, a housing having a plurality of separating chambers therein, means for drawing the well fluids from the casing into the chambers, means within each chamber for agitating said fluids as well as reducing the pressures thereon as said fluids enter the chambers whereby the free gas and some of the gas in solution is released from the oil, means for conducting the separated oil from the chambers to the tubing string whereby said oil is delivered to the well pump, and means for releasing the separated gas into the well casing above the well fluid level therein.

12. The combination with a well casing and a well tubing having a reciprocating fluid pump therein of an oil and gas separator connected to the lower end of the tubing and including, a housing having a plurality of separating chambers therein, means for drawing the well fluids from the casing into the chambers, means for agitating said fluids as well as reducing the pressures thereon as said fluids enter the chambers whereby the free gas and some of the gas in solution is released from the oil, means for conducting the separated oil from the chambers under a pressure, whereby further liberation of gas in solution is prevented, and means for delivering the oil to the well pump under such pressure.

13. The combination with a well casing and a well tubing having a reciprocating fluid pump therein of an oil and gas separator connected to the lower end of the tubing and including, a housing having a plurality of separating chambers therein, a reciprocating piston in each chamber for drawing the well fluids consisting of a gas-oil mixture from the casing into the chamber, wherein the gas and oil are separated, said pistons acting to expel the separated gas and oil from the chambers and to deliver the oil to the well pump under a pressure, and means for connecting said pistons to the well tubing whereby the elongation and retraction of the well tubing caused by the operation of the well pump is utilized to reciprocate the piston.

14. The combination with a well casing and a well tubing having a reciprocating fluid pump therein of an oil and gas separator connected to the lower end of the tubing and including, a housing having a plurality of separating chambers therein, a reciprocating piston in each chamber for drawing the well fluids consisting of a gas-oil mixture from the casing into the chamber, wherein the gas and oil are separated, said pistons acting to expel the separated gas and oil from the chambers and to deliver the oil to the well pump under a pressure, means for connecting the pistons to the lower check valve of the well pump whereby the weight of the fluid column on said valve during the downstroke of the well pump plunger forces the pistons downwardly, and resilient means for raising said pistons during the upstroke of said plunger.

15. The combination with a well casing and a well tubing having a reciprocating fluid pump therein of an oil and gas separator connected to the lower end of the tubing and including, a housing having a plurality of separating chambers therein, a reciprocating piston in each chamber for drawing the well fluids consisting of a gas-oil mixture from the casing into the chamber, wherein the gas and oil are separated, said pistons acting to expel the separated gas and oil from the chambers and to deliver the oil to the well pump under a pressure, and means for connecting the pistons to the plunger of the well pump, whereby said pistons are reciprocated by said plunger.

16. The combination with a well casing and a well tubing having a reciprocating fluid pump therein of an oil and gas separator connected to the lower end of the tubing and including, a housing forming a separating chamber, an electrically operated pump for drawing the well fluids consisting of a gas-oil mixture from the well casing and for agitating and discharging the same into the chamber whereby separation of the gas and oil occurs in the chambers, and a conductor extending into the chamber and leading from the well pump for conducting the separated oil to said pump.

17. The combination with a well casing and a well tubing having a reciprocating fluid pump therein, of an oil and gas separator connected to the lower end of the tubing and including, a movable mechanical agitator for agitating the well fluids at the bottom of the hole for separating the major portion of the gas from the oil, and means on the exterior of the well tubing for contacting the well fluids to further promote separation of the gas and oil.

18. The combination with a well pump for lifting well fluid of movable means connected with the lower end of the pump for agitating the well fluid to promote separation of the gas from the oil of said well fluid prior to the delivery of the oil to the pump.

19. The combination with a well fluid lifting mechanism of means connected to the mechanism for delivering the well fluid to said mechanism under a pressure sufficient to prevent liberation of gas in solution from the fluid.

20. As a sub-combination in a separating device, a tubular housing having separating chambers therein for receiving the well fluid, and means within each chamber for agitating the well fluids in said chamber for promoting separation of the gas from the oil in said fluids.

21. As a sub-combination in a separating device, a tubular housing for receiving well fluids consisting of a gas-oil mixture, and reciprocating means for maintaining the fluid in and surrounding the housing in motion whereby the same is agitated and the gas and oil separated.

22. As a sub-combination in a separating device, a tubular housing for receiving well fluid consisting of a gas-oil mixture, means for maintaining the fluid in and surrounding the housing in motion whereby the same is agitated and the gas and oil separated, and means for creating a back pressure in the housing, whereby the separated oil is expelled from the housing under a pressure sufficient to prevent liberation of the gas in solution with the oil at the time said oil is expelled.

23. An oil and gas separator for separating the oil and gas in the well bore including, a housing having a separating chamber for receiving the well fluids consisting of a gas-oil mixture, means reciprocable within the separating chamber for agitating the mixture to separate the gas from the oil, and means for conducting the separated oil to the well tubing string, whereby said oil may be lifted therethrough.

24. An oil and gas separator adapted to be connected to the lower end of a tubing string and lowered therewith into the well casing, said separator including, a housing having a separating chamber therein, means for circulating the well fluid consisting of a gas-oil mixture through the chamber to separate the gas from the oil, means for conducting the separated oil to the well tubing, and means for utilizing the pressure of the liberated gas to aid in maintaining the separated oil under a pressure sufficient to prevent liberation of the gas in solution with the oil during the delivery of said oil to the well tubing.

25. The combination with a well casing and a well tubing having a reciprocating fluid pump therein of an oil and gas separator connected to the lower end of the tubing and including, a housing having a plurality of separating chambers therein, means for drawing the well fluids from the casing into the chambers, movable means for agitating said fluids as well as reducing the pressures thereon as said fluids enter the chambers whereby the free gas and some of the gas in solution is released from the oil, means for conducting the separated oil from the chambers to the tubing string whereby said oil is delivered to the well pump, and means for utilizing the pressure of the liberated gas to aid in maintaining the separated oil under a pressure sufficient to prevent liberation of the gas in solution with the oil during the delivery of said oil to the well tubing.

CLIFFORD T. McCOY.